United States Patent
Togashi (10) Patent No.: US 7,231,454 B2
(45) Date of Patent: Jun. 12, 2007

(54) MULTIMEDIA DATA RELAY SYSTEM, MULTIMEDIA DATA RELAY APPARATUS, AND MULTIMEDIA DATA RELAY METHOD

(75) Inventor: Yuuichi Togashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 802 days.

(21) Appl. No.: 10/107,345

(22) Filed: Mar. 28, 2002

(65) Prior Publication Data

US 2002/0143977 A1 Oct. 3, 2002

(30) Foreign Application Priority Data

Mar. 29, 2001 (JP) ............................. 2001-095974

(51) Int. Cl.
*G06F 15/16* (2006.01)
(52) U.S. Cl. .................... 709/231; 709/203; 709/217
(58) Field of Classification Search ............... 709/203, 709/231, 200–202, 217–227; 705/26; 715/91
See application file for complete search history.

(56) References Cited

U.S. PATENT DOCUMENTS

| | | | |
|---|---|---|---|
| 5,841,979 A | 11/1998 | Schulhof et al. ....... 395/200.67 |
| 6,418,421 B1 * | 7/2002 | Hurtado et al. ............... 705/54 |
| 6,507,727 B1 * | 1/2003 | Henrick ..................... 455/3.06 |
| 6,549,942 B1 * | 4/2003 | Janky et al. ................. 709/219 |
| 6,681,120 B1 * | 1/2004 | Kim ......................... 455/556.1 |
| 6,792,280 B1 * | 9/2004 | Hori et al. .................. 455/517 |
| 7,000,005 B2 * | 2/2006 | Suzuki et al. ............... 709/217 |
| 7,054,914 B2 * | 5/2006 | Suzuki et al. ............... 709/217 |
| 7,065,342 B1 * | 6/2006 | Rolf ........................ 455/412.1 |
| 2002/0183985 A1 * | 12/2002 | Hori et al. ...................... 703/1 |
| 2002/0184154 A1 * | 12/2002 | Hori et al. .................... 705/50 |
| 2002/0184492 A1 * | 12/2002 | Hori et al. .................. 713/158 |

OTHER PUBLICATIONS

Author unknown, "Press Release—SD Memory Card", Aug. 25, 1999, Accessed from: http://panasonic.com/MECA/press_releases/sdmedia_99.09.25.html on Sep. 16, 2005.*
Paul Hyde, "Java Thread Programming", Aug. 1999, Sams Publishing, Chapter 13—Thread Pooling.*

* cited by examiner

*Primary Examiner*—Moustafa M. Meky
(74) *Attorney, Agent, or Firm*—Finnegan, Henderson, Farabow, Garrett & Dunner, L.L.P.

(57) ABSTRACT

In this invention, relay processing is executed for multimedia data input from a server without using any storage device. A plurality of processing units that execute the same processing are prepared at each stage, and a unit that has ended processing is caused to execute the relay processing, thereby quickening the relay processing. Processing on each processing unit is executed in a working area on a memory without using any storage device.

12 Claims, 6 Drawing Sheets

MULTIMEDIA DATA RELAY SYSTEM, MULTIMEDIA DATA RELAY APPARATUS, AND MULTIMEDIA DATA RELAY METHOD

CROSS-REFERENCE TO RELATED APPLICATIONS

This application is based upon and claims the benefit of priority from the prior Japanese Patent Application No. 2001-095974, filed Mar. 29, 2001, the entire contents of which are incorporated herein by reference.

BACKGROUND OF THE INVENTION

1. Field of the Invention

The present invention relates to a multimedia data relay system, multimedia data relay apparatus, and multimedia data relay method.

2. Description of the Related Art

When multimedia data such as music data on a web server is to be written to a recording medium such as a memory card attached to a personal computer, the multimedia data on the web server is temporarily downloaded and relayed by the portable information device (relay apparatus) such as the personal computer and then written in the relay target, i.e., the recording medium through a terminal apparatus such as a PDA.

More specifically, multimedia data received through a network such as the Internet is temporarily stored in the storage device of a relay apparatus, and the stored multimedia data is transmitted in accordance with a transmission request from a terminal apparatus such as a PDA.

When the data format need be converted, a temporary memory in the relay apparatus is used. The multimedia data is gradually loaded from the server to the temporary memory, converted, and then written in the storage device.

However, according to the conventional multimedia data relay system, multimedia data is temporarily written in a storage device such as a hard disk. In this case, if a multimedia data transmission request is issued from a terminal apparatus such as a PDA, and the data is not present in the storage device, the data must be received from the server and written to the storage device again. For this reason, the multimedia data transmission rate decreases.

Additionally, for encrypted data, since the data is written to the storage device, the data is readily read and decrypted.

BRIEF SUMMARY OF THE INVENTION

The present invention has been made in consideration of the above situation, and has as its object to provide a multimedia data relay system, multimedia apparatus, and multimedia data relay method, which can relay multimedia data without using any storage device to quickly relay the multimedia data and can also make it difficult to decrypt encrypted data.

In order to achieve the above object, according to a first aspect of the invention, there is provided a multimedia data relay apparatus comprising a plurality of first data conversion units which execute first conversion processing for multimedia data, a plurality of second data conversion units which execute second conversion processing for the multimedia data that have undergone the first conversion processing by the plurality of first data conversion units, first determination means for determining whether a first data conversion unit that has ended processing is present in the plurality of first data conversion units, acquisition means for, when the first determination means determines that the first data conversion unit that has ended processing is present, acquiring multimedia data each having a size processible by each of the plurality of first and second data conversion units from a server, first input means for inputting the multimedia data acquired by the acquisition means to the first data conversion unit that has ended processing, second determination means for determining whether a second data conversion unit that has ended processing is present in the plurality of second data conversion units, second input means for, when the second determination means determines that the second data conversion unit that has ended processing is present, inputting the multimedia data that has undergone the first conversion processing by the first data conversion unit to the second data conversion unit that has ended processing, and output means for outputting the multimedia data that have undergone the second conversion processing by the plurality of second data conversion units to a relay target in an order of input to the plurality of first data conversion units by the first input means.

The first aspect includes the following constitutions.

(1) The first conversion processing in the first data conversion unit and the second conversion processing in the second data conversion unit are executed using a working area of a memory.

(2) In (1), the memory comprises a plurality of first working areas arranged in correspondence with the plurality of first data conversion units, respectively, to execute the first conversion processing, and a plurality of second working areas arranged in correspondence with the plurality of second data conversion units, respectively, to execute the second conversion processing.

(3) When the first determination means determines that the first data conversion unit that has ended processing is present, the acquisition means outputs a transmission request of multimedia data each having a size processible by each of the plurality of first and second data conversion units to the server, thereby acquiring the multimedia data from the server.

(4) The first conversion processing is format conversion processing or encryption processing.

According to a second aspect of the invention, there is provided a multimedia data relay system comprising a server which stores multimedia data, and a data relay apparatus which executes predetermined processing for the multimedia data from the server and outputs the multimedia data that has undergone the predetermined processing to a relay target, wherein the data relay apparatus comprises a plurality of first data conversion units which execute first conversion processing for the multimedia data, a plurality of second data conversion units which execute second conversion processing for the multimedia data that have undergone the first conversion processing by the plurality of first data conversion units, first determination means for determining whether a first data conversion unit that has ended processing is present in the plurality of first data conversion units, acquisition means for, when the first determination means determines that the first data conversion unit that has ended processing is present, acquiring multimedia data each having a size processible by each of the plurality of first and second data conversion units from a server, first input means for inputting the multimedia data acquired by the acquisition means to the first data conversion unit that has ended processing, second determination means for determining whether a second data conversion unit that has ended processing is present in the plurality of second data conversion units, second input means for, when the second determination means determines that the second data conversion unit that has ended processing is present, inputting the multimedia data that has undergone the first conversion processing by the first data conversion unit to the second data conversion unit that has ended processing, and output means for outputting the multimedia data that have undergone the second conversion processing by the plurality of second data conversion units to a relay target in an order of input to the plurality of first data conversion units by the first input means.

According to a third aspect of the invention, there is provided a multimedia data relay method in a multimedia data relay system comprising a plurality of first data conversion units which execute first conversion processing for multimedia data and a plurality of second data conversion units which execute second conversion processing for the multimedia data that have undergone the first conversion processing by the plurality of first data conversion units, comprising steps of determining whether a first data conversion unit that has ended processing is present in the plurality of first data conversion units, when it is determined that the first data conversion unit that has ended processing is present, acquiring multimedia data each having a size processible by each of the plurality of first and second data conversion units from a server, inputting the acquired multimedia data acquired to the first data conversion unit that has ended processing, determining whether a second data conversion unit that has ended processing is present in the plurality of second data conversion units, when it is determined that the second data conversion unit that has ended processing is present, inputting the multimedia data that has undergone the first conversion processing by the first data conversion unit to the second data conversion unit that has ended processing, and outputting the multimedia data that have undergone the second conversion processing by the plurality of second data conversion units to a relay target in an order of input to the plurality of first data conversion units by the first input means.

According to a fourth aspect of the invention, there is provided a multimedia data relay apparatus comprising acquisition means for acquiring multimedia data from a server, a first application program to execute first processing for the multimedia data acquired by the acquisition means, a second application program to execute second processing for the multimedia data that has undergone the first processing by the first application program, a memory comprising a plurality of first working areas to execute the first processing and a plurality of second working areas to execute the second processing, control means for causing the first application program to execute the first processing for the multimedia data acquired by the acquisition means using one of the plurality of first working areas, where processing has been ended, and causing the second application program to execute the second processing for the multimedia data that has undergone the first processing using one of the plurality of second working areas, where processing has been ended, and output means for outputting the multimedia data that has undergone the second processing to a relay target.

According to the fourth aspect of the invention, there is also provided a multimedia data relay system comprising a server computer which stores multimedia data, a portable telephone which acquires the multimedia data from the server computer, executes relay processing for the acquired multimedia data, and outputs the multimedia data, and a music player which writes the multimedia data output from the portable telephone, which has undergone the relay processing, in a memory card, wherein the portable telephone sequentially acquires multimedia data each having a size processible by the portable telephone from the server computer and executes the relay processing for the acquired multimedia data on the basis of a multimedia data request from the music player.

The fourth aspect includes the following constitutions.

(1) The portable telephone is a PHS.

(2) The memory card is an SD memory card.

(3) The portable telephone acquires the multimedia data from the server computer when the relay processing becomes possible.

(4) The portable telephone comprises a plurality of first data conversion units which execute first conversion processing for the multimedia data, a plurality of second data conversion units which execute second conversion processing for the multimedia data that have undergone the first conversion processing by the plurality of first data conversion units, first determination means for determining whether a first data conversion unit that has ended processing is present in the plurality of first data conversion units, acquisition means for, when the first determination means determines that the first data conversion unit that has ended processing is present, acquiring multimedia data each having a size processible by each of the plurality of first and second data conversion units from a server, first input means for inputting the multimedia data acquired by the acquisition means to the first data conversion unit that has ended processing, second determination means for determining whether a second data conversion unit that has ended processing is present in the plurality of second data conversion units, second input means for, when the second determination means determines that the second data conversion unit that has ended processing is present, inputting the multimedia data that has undergone the first conversion processing by the first data conversion unit to the second data conversion unit that has ended processing, and output means for outputting the multimedia data that have undergone the second conversion processing by the plurality of second data conversion units to a relay target in an order of input to the plurality of first data conversion units by the first input means.

According to a fifth aspect of the invention, there is provided a portable telephone which acquires multimedia data from a server computer which stores the multimedia data, executes relay processing for the acquired multimedia data, and outputs the multimedia data, comprising acquisition means for sequentially acquiring multimedia data each having a size processible by the portable telephone from the server computer, and output means for executing the relay processing for the multimedia data acquired by the acquisition means and outputting the multimedia data that has undergone the relay processing.

The fifth aspect includes the following constitution.

(1) The acquisition means acquires the multimedia data from the server computer when the relay processing becomes possible.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

A multimedia data relay system according to an embodiment of the present invention will be described next.

First Embodiment

Figure 1:
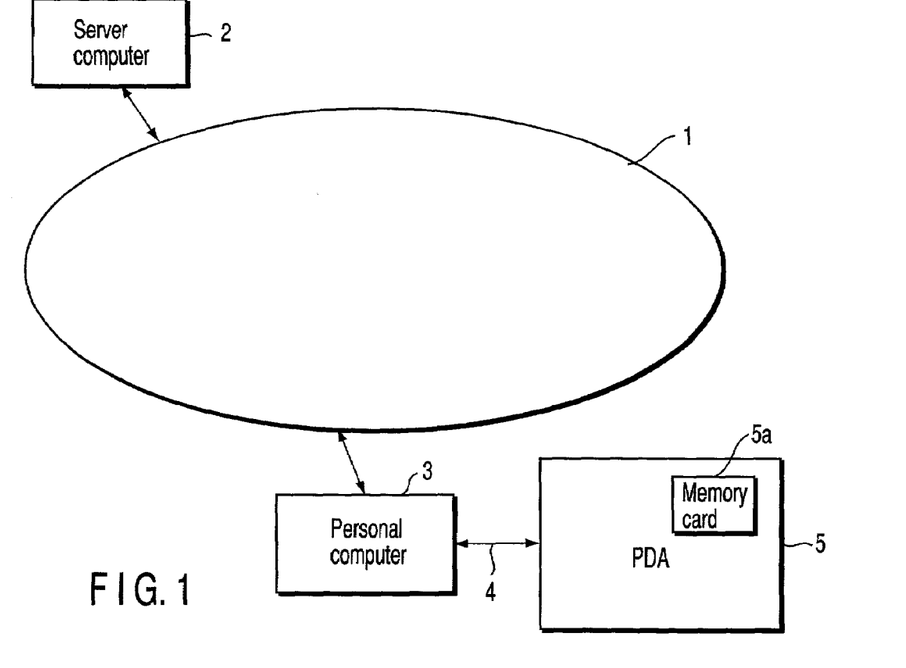
FIG. 1 is a view showing a multimedia data relay system according to the first embodiment of the present invention.

FIG. 1 is a view showing a multimedia data relay system according to an embodiment of the present invention.

As shown in FIG. 1, a server computer 2 and personal computer 3 are connected to a network 1.

Multimedia data such as MP3 music data and video data are stored in the server computer 2.

The personal computer 3 acts as a relay apparatus which executes predetermined processing for multimedia data transmitted from the server computer 2 and then transmits the multimedia data that has undergone the predetermined processing to a PDA 5 serving as a portable information device.

The PDA 5 is connected to the personal computer 3 through a data bus 4 such as a serial bus or USB bus and acts as a terminal apparatus which writes to a memory card 5a, the multimedia data that has undergone the predetermined processing and is transmitted from the personal computer through the data bus 4.

Figure 2:
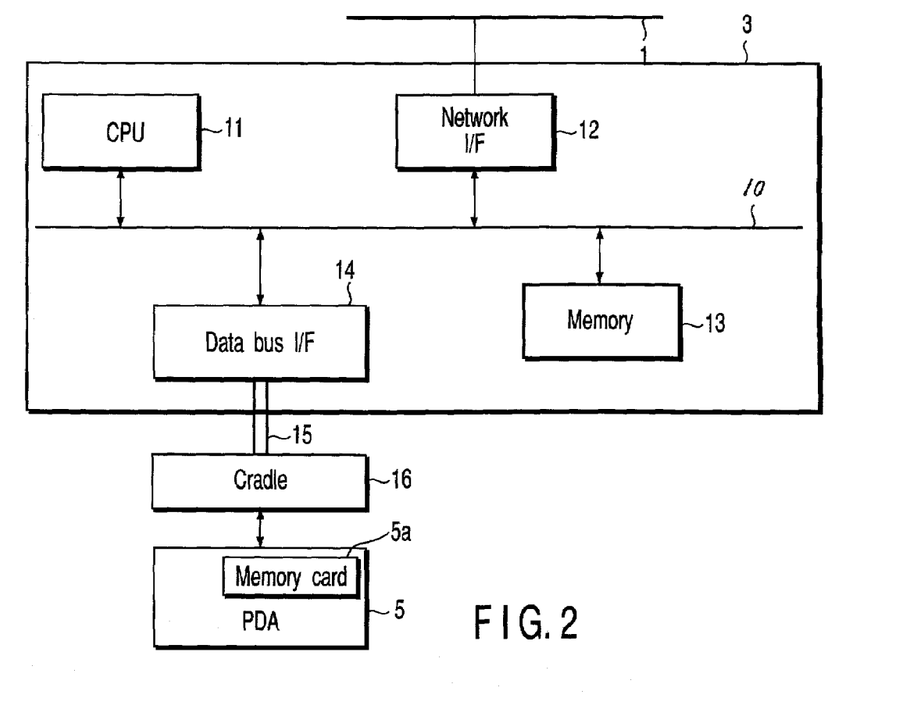
FIG. 2 is a block diagram showing the hardware configuration of a personal computer serving as a relay apparatus.

FIG. 2 is a block diagram showing the hardware configuration of the personal computer 3 serving as a relay apparatus.

As shown in FIG. 2, the personal computer serving as a relay apparatus of this embodiment has a CPU 11 connected to a system bus 10, a network interface 12, a memory 13, and a data bus interface 14.

The CPU 11 controls the entire relay processing in the personal computer 3.

The network interface 12 loads multimedia data transmitted from the server through the network 1 to the personal computer 3.

Figure 3:
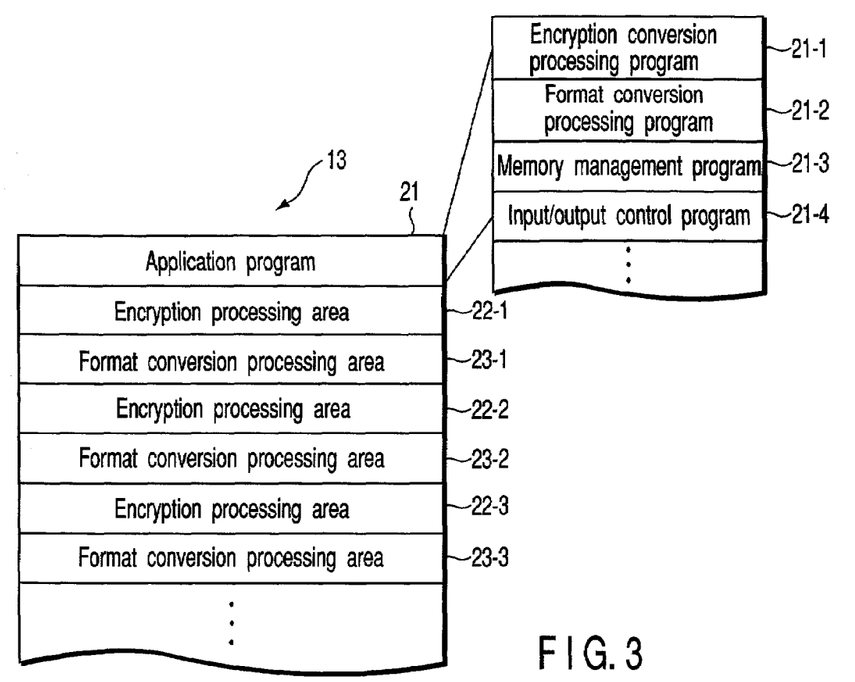
FIG. 3 is a view showing the use state of the memory of the personal computer.

The memory 13 has an application program to execute multimedia data relay processing and a working area to execute the relay processing. FIG. 3 is a view showing the memory 13.

As shown in FIG. 3, the memory 13 stores an application program 21 to execute relay processing. The memory 13 has, for the respective units, encryption conversion processing areas 22-1 to 22-3 and format conversion processing areas 23-1 to 23-3 to execute encryption conversion processing and format conversion processing as relay processing.

The application program 21 has an encryption conversion processing program 21-1 to execute encryption conversion processing of multimedia data, a format conversion processing program 21-2 to execute format conversion processing of multimedia data, a memory management program 21-3 to manage the encryption conversion processing areas 22-1 to 22-3 and format conversion processing areas 23-1 to 23-3, and an input/output control program 21-4 to control input/output of multimedia data.

Referring back to FIG. 2, the data bus interface 14 outputs the multimedia data that has undergone data relay processing to a cradle 16 of the PDA 5 through a data bus 15.

The PDA 5 writes, in the memory card 5a, the multimedia data that has undergone the relay processing and is received through the cradle 16.

Figure 4:
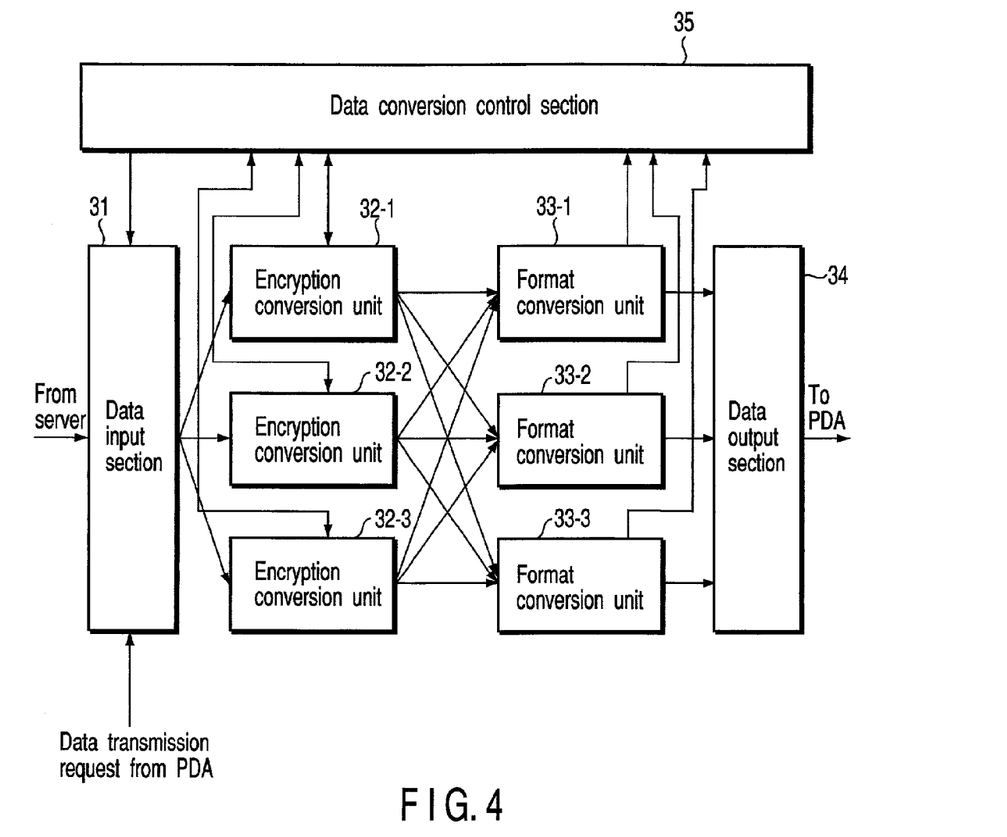
FIG. 4 is a functional block diagram of the personal computer serving as a relay apparatus.

FIG. 4 is a functional block diagram of the personal computer 3 serving as a relay apparatus.

As shown in FIG. 4, the personal computer 3 serving as a relay apparatus of this embodiment has a data input section 31, encryption conversion units 32-1 to 32-3, format conversion units 33-1 to 33-3, data output section 34, and data conversion control section 35.

Upon receiving a data transmission request from the PDA, the data input section 31 requests transmission of multimedia data each having a size processible by each of the encryption conversion units 32-1 to 32-3 and format conversion units 33-1 to 33-3. The data input section 31 acquires multimedia data which is transmitted in accordance with the multimedia data transmission request. The data input section 31 inputs the acquired multimedia data to one of the encryption conversion units 32-1 to 32-3, which has ended encryption conversion processing and for which the data conversion control section 35 has notified the data input section that the processing is ended.

The encryption conversion units 32-1 to 32-3 execute encryption processing for the multimedia data having a predetermined size and input from the data input section 31. The encryption conversion units 32-1 to 32-3 execute the same encryption processing for the multimedia data.

That is, the multimedia data are sequentially input from the data input section 31 to the encryption conversion units 32-1 to 32-3 that have ended processing. Each of the encryption conversion units 32-1 to 32-3 notifies the data conversion control section 35 of the end of the encryption processing.

The encryption conversion units 32-1 to 32-3 output the multimedia data that have undergone the encryption processing to the format conversion units 33-1 to 33-3, which have ended conversion processing, and for which the data conversion control section 35 has notified the encryption conversion units that the processing is ended.

The encryption processing operations in the encryption conversion units 32-1 to 32-3 are executed in the encryption conversion processing areas 22-1 to 22-3 of the memory shown in FIG. 3, respectively. Hence, the encryption processing operations in the encryption conversion units 32-1 to 32-3 can be parallelly executed.

The format conversion units 33-1 to 33-3 execute format conversion processing of the multimedia data for which encryption processing has been executed by the encryption conversion units 32-1 to 32-3. With this format conversion processing, for example, music data having a WAVE format is converted into a music data file having an MP3 format. The format conversion units 33-1 to 33-3 execute the same format conversion processing for the multimedia data.

That is, the multimedia data for which encryption processing has been executed by the encryption conversion units 32-1 to 32-3 are sequentially input to the format conversion units 33-1 to 33-3 which have ended processing. Each of the format conversion units 33-1 to 33-3 notifies the data conversion control section 35 of the end of the format conversion processing.

The format conversion units 33-1 to 33-3 output the multimedia data that have undergone the format conversion processing to the data output section 34.

The format conversion processing operations in the format conversion units 33-1 to 33-3 are executed in the format conversion processing areas 23-1 to 23-3 of the memory shown in FIG. 3, respectively. Hence, the format conversion processing operations in the format conversion units 33-1 to 33-3 can be parallelly executed.

The data output section 34 outputs the multimedia data each having a predetermined size, which have undergone the format conversion processing and are output from the format conversion units 33-1 to 33-3, to the PDA serving as a terminal apparatus in accordance with the order to input to the data input section 31.

As for the rearrangement processing of the multimedia data, each of which has a predetermined size and has undergone the format conversion processing, in the data output section 34, for example, the data input section 31 adds identifiers representing the order to the units of the received multimedia data, respectively. The data output section 34 rearranges the multimedia data output from the format conversion units 33-1 to 33-3 on the basis of the identifiers added to the multimedia data.

The data conversion control section 35 receives a notification of the end of encryption processing from each of the encryption conversion units 32-1 to 32-3. The section 35 notifies the data input section 31 of an encryption conversion unit that has ended encryption processing. In addition, the data conversion control section 35 receives a notification of the end of format conversion processing from each of the format conversion units 33-1 to 33-3. The section 35 notifies the encryption conversion units 32-1 to 32-3 of a format conversion unit that has ended format conversion processing.

The functions of the data input section 31 and data output section 34 shown in FIG. 4 are realized by the input/output control program 21-4. The function of the data conversion control section 35 is realized by the memory management program 21-3. The function of the encryption conversion units 32-1 to 32-3 is realized by the encryption conversion processing program 21-1. The function of the format conversion units 33-1 to 33-3 is realized by the format conversion processing program 21-2.

The operation of the multimedia data relay system according to the embodiment of the present invention will be described next with reference to FIGS. 5 and 6.

First, it is determined whether a transmission request is received from the PDA serving as a terminal apparatus (S1). If YES in step S1, it is determined next whether an encryption conversion unit that has ended processing is present (S2).

If YES in step S2, the server is requested to transmit multimedia data (S3). The multimedia data requested here has a predetermined size processible in each of the encryption conversion units and format conversion units.

In step S4, the multimedia data having a predetermined size and transmitted from the server is received (S4). The received multimedia data is input to an encryption conversion unit that has ended encryption processing (S5).

The encryption conversion unit that has received the multimedia data executes encryption processing for the received multimedia data (S6). It is determined next whether a format conversion unit that has ended processing is present (S7). If YES in step S7, the multimedia data that has undergone the encryption processing is input to the format conversion unit that has ended processing (S8).

The format conversion unit that has received the multimedia data executes format conversion processing for the received multimedia data that has undergone the encryption processing (S9). The multimedia data after format conversion is output to the data output section (S10).

The data output section rearranges the multimedia data that have undergone the format conversion in accordance with the order of input to the data input section (S11). The data output section outputs the rearranged multimedia data to the PDA (S12). That is, multimedia data to be output from each format conversion unit to the data output section is output after the format conversion processing in that format conversion unit is ended. In addition, each encryption conversion unit receives the multimedia data when the encryption conversion unit has ended encryption processing. For this reason, the multimedia data are input to the data output section not in any specific order. Hence, the data output section must control the order of multimedia data that have undergone the format conversion processing.

It is determined next whether all the requested multimedia data are output to the PDA (S13). If YES in step S13, the flow returns to step S1. If NO in step S13, the flow returns to step S2.

According to the multimedia data relay system of this embodiment, no storage device is used. When the PDA requests multimedia data, multimedia data each having a predetermined size are acquired from the server. The multimedia data each having a predetermined size are sequentially parallelly processed by the plurality of encryption conversion units and format conversion units and output. For this reason, the data can be efficiently relayed.

In addition, instead of writing encrypted multimedia data in a storage device, data is encrypted on the memory and output. Hence, the data is hardly decrypted.

Second Embodiment

In the above embodiment, a case wherein multimedia data received from a server computer is relayed by the personal computer 3 and written in the memory card of a PDA has been described.

In the second embodiment, a portable telephone such as a PHS executes multimedia data relay processing, and the relayed multimedia data is written in the memory card of a music player.

Figure 10:
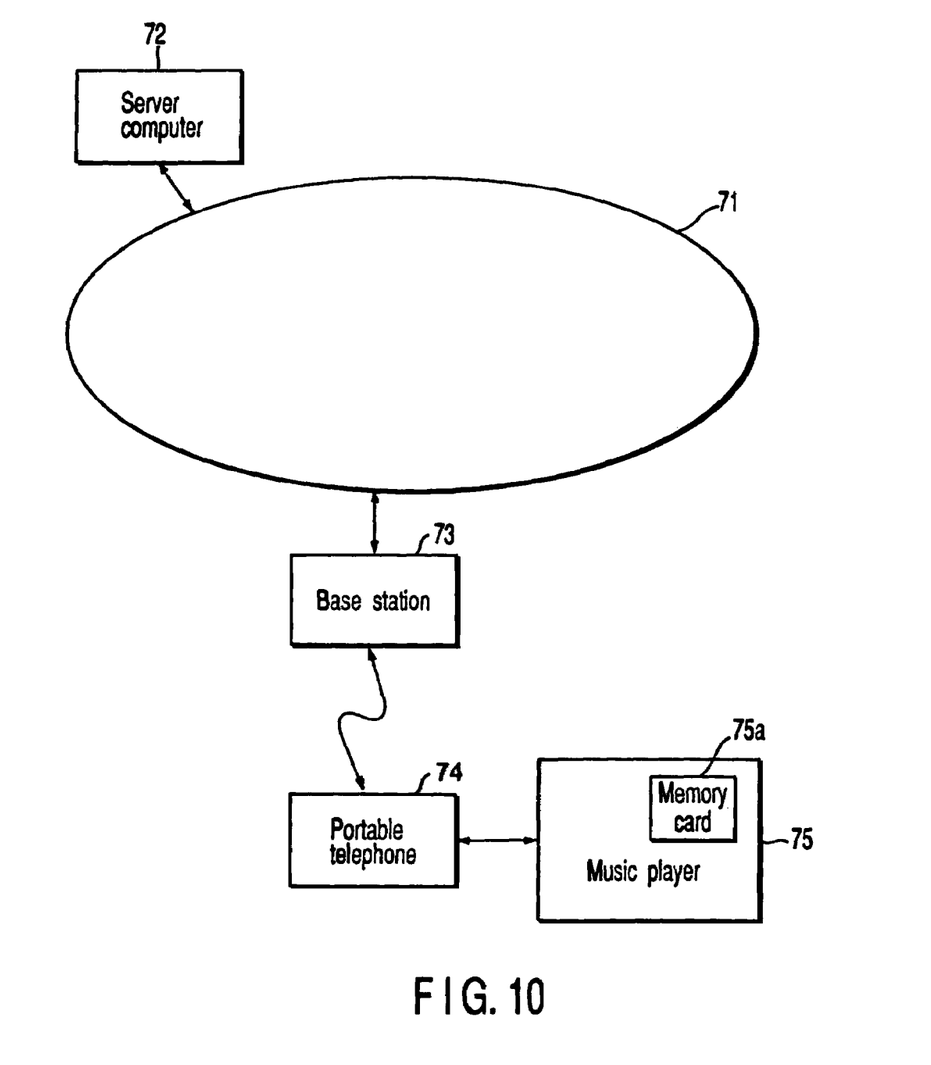
FIG. 10 is a view showing a multimedia data relay system according to the second embodiment of the present invention.

FIG. 10 is a view showing a multimedia data relay apparatus according to the second embodiment of the present invention.

Referring to FIG. 10, reference numeral 71 denotes a network such as the Internet. A server computer 72 to supply multimedia data (music data) and a base station 73 to transmit the multimedia data downloaded from the server computer 72 to a portable telephone 74 using a radio channel and also to transmit a multimedia data request from the portable telephone 74 to the server computer through the network are connected to the network 71.

The portable telephone 74 plays a role of a relay apparatus which executes relay processing for multimedia data transmitted from the server computer 72 and writes the relayed multimedia data in a memory card 75a of a music player 75. The memory card 75a is, e.g., an SD memory card. The portable telephone 74 and music player 75 are connected through, e.g., a USB bus.

That is, as the characteristic feature of the relay system of this embodiment, the relay processing in the personal computer 3 shown in FIG. 1 is executed by the portable telephone 74. Referring to FIG. 10, multimedia data is written in the memory card 75a of the music player 75, though the multimedia data may be written in a PDA, as shown in FIG. 1.

The portable telephone 74 has an application program, encryption processing areas, and format conversion processing areas shown in FIG. 3. The portable telephone 74 has the data input section, encryption conversion units, format conversion units, data output section, and data conversion control section shown in FIG. 4.

Figure 5:
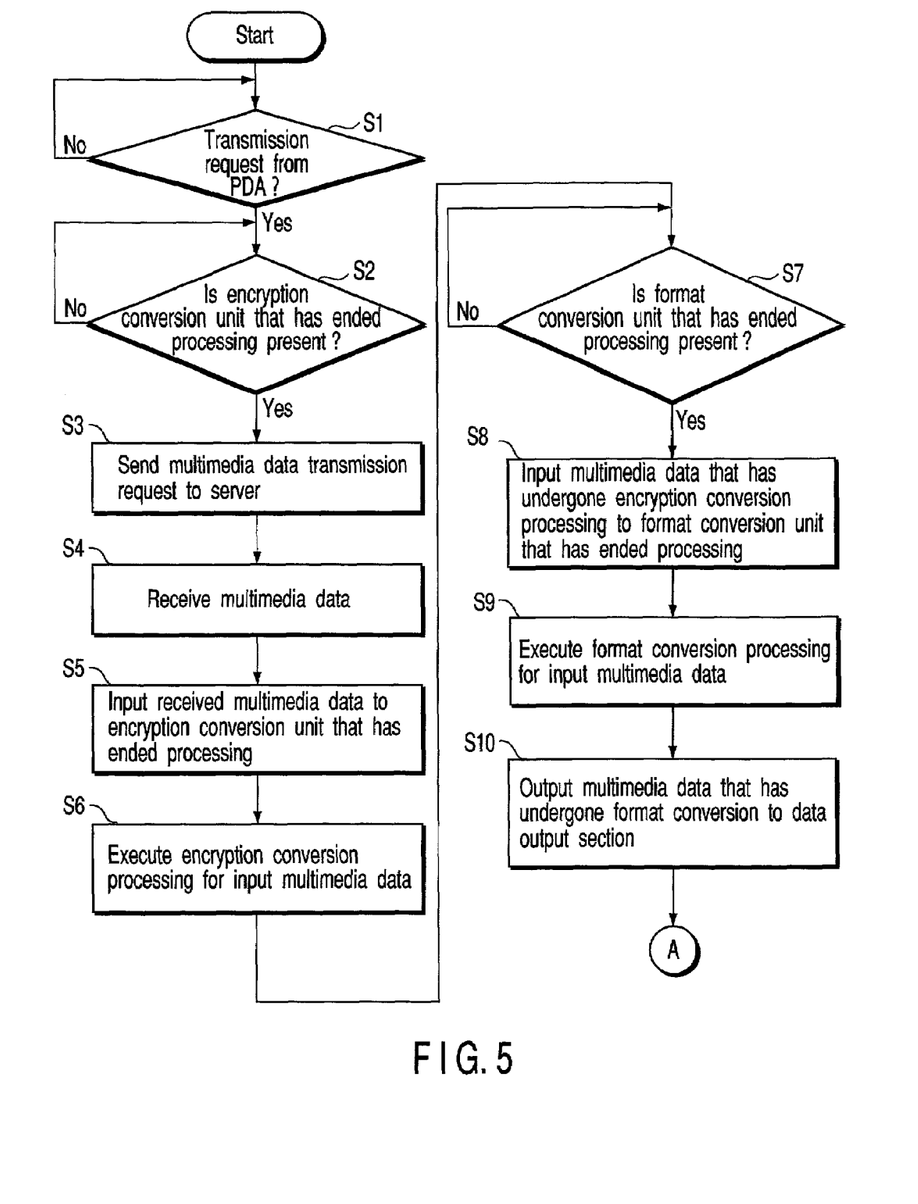
FIG. 5 is a flowchart for explaining the operation of the multimedia data relay system according to the embodiment of the present invention.
Figure 6:
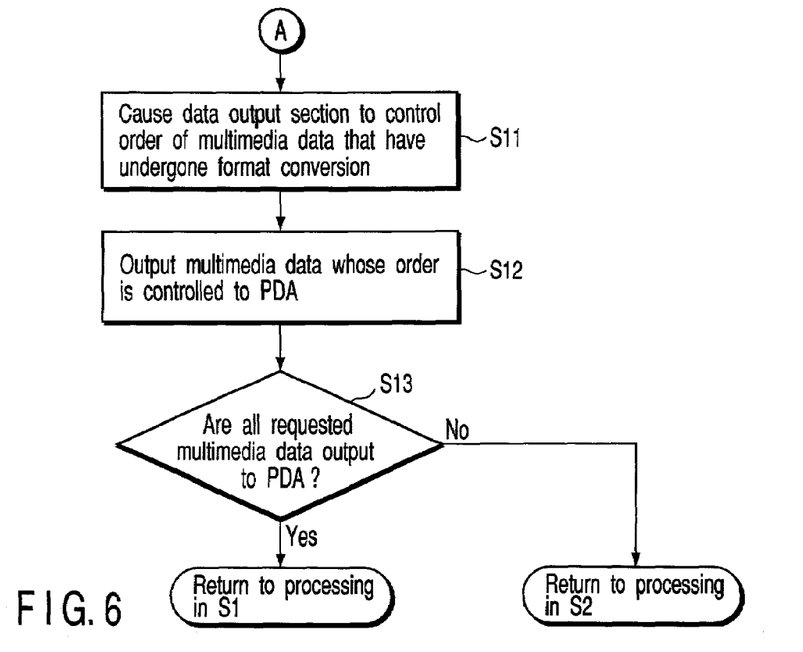
FIG. 6 is a flowchart for explaining the operation of the multimedia data relay system according to the embodiment of the present invention.

Processing shown in the flowcharts of FIGS. 5 and 6 is executed. Referring to FIGS. 4 to 6, "PDA" is replaced with "music player".

Hence, according to the multimedia data relay system of this embodiment, even a portable telephone such as a PHS having no hard disk drive can relay multimedia data.

Modifications

A multimedia data relay apparatus according to a modification of the present invention will be described next. In the multimedia data relay apparatus of the above-described embodiment, all relay processing operations are performed in the personal computer.

In this modification, the relay function is distributed to data relay apparatuses.

Figure 7:
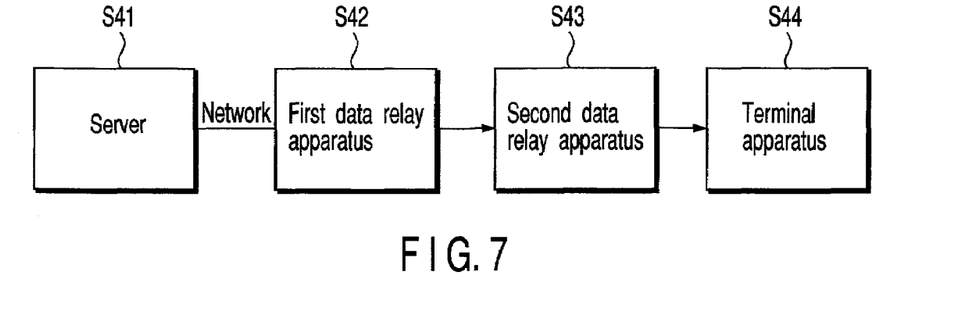
FIG. 7 is a block diagram showing the arrangement of a multimedia data relay system according to a modification of the present invention.

FIG. 7 is a block diagram showing the arrangement of a multimedia data relay system according to a modification of the present invention. As shown in FIG. 7, the multimedia data relay system according to the modification of the present invention has a first data relay apparatus 42 connected to a server 41 through a network, a second data relay apparatus 43 connected to the data relay apparatus 42, and a terminal apparatus 44.

In this modification, the first data relay apparatus 42 executes, e.g., encryption processing in the encryption conversion units shown in FIG. 4. The second data relay apparatus 43 executes format conversion processing in the format conversion units.

In this case, the function of the data input section 31 shown in FIG. 4 is provided in the first data relay apparatus 42. The function of the data output section 34 is provided in the second data relay apparatus. A data conversion control section 35 is provided in both the first and second data relay apparatuses. However, the present invention is not limited to this arrangement.

When a plurality of relay apparatuses are prepared, and each relay apparatus executes processing at each stage, the load can be distributed.

Additionally, the system can cope with servers or terminals with various specifications by dynamically changing the arrangement of devices or modules in the devices. For example, the system can easily cope with even new codec employed as a standard by adding software or adding new hardware.

Figure 8:
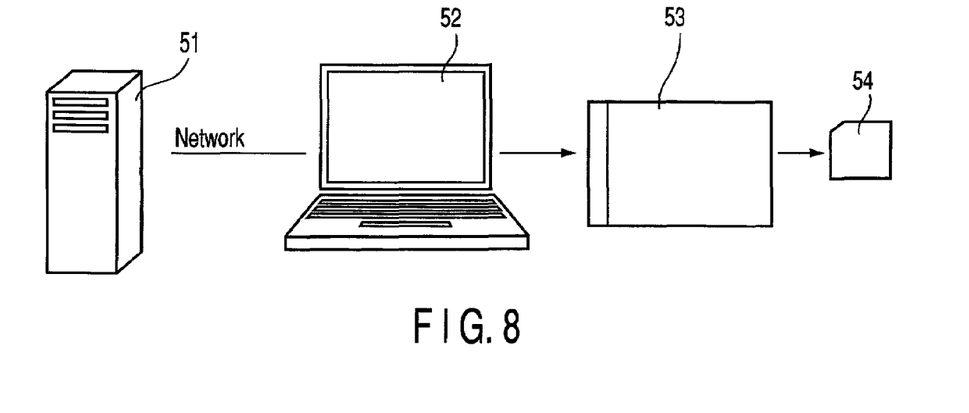
FIG. 8 is a view showing a multimedia data relay system according to another modification of the present invention.

FIG. 8 is a view showing a data relay system.

Referring to FIG. 8, reference numeral 51 denotes a server. A personal computer 52 serving as a first data relay apparatus is connected to the server 51 through a network. A card adapter 53 serving as a second data relay apparatus is attached to the personal computer 52. Reference numeral 54 denotes a card memory in which data processed by the card adapter 53 is written.

Figure 9:
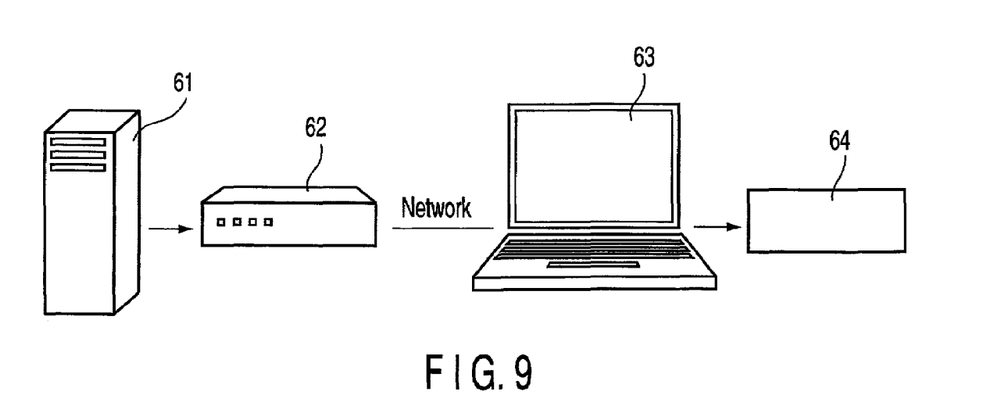
FIG. 9 is a view showing a multimedia data relay system according to still another modification of the present invention.

FIG. 9 is a view showing a multimedia data relay system according to still another modification of the present invention.

As shown in FIG. 9, in the multimedia data relay system according to still another modification of the present invention, a first data relay apparatus 62 is arranged on a side close to a server 61, and a personal computer 63 serving as a second data relay apparatus is connected to the first data relay apparatus 62 through a network. Reference numeral 64 denotes a memory card in which data is written by the second data relay apparatus 63.

Even in this multimedia data relay system, since a plurality of relay apparatuses are prepared, and each relay apparatus executes processing at each stage, the load can be distributed.

Hence, according to the multimedia data relay system of this embodiment, since multimedia data relay processing can be executed without using any storage device, relay processing can be quickly executed.

In addition, since encrypted data is not written in a storage device, the data is hardly decrypted.

In this embodiment, encryption processing and format conversion processing have been described as relay processing. However, the present invention is not limited to this. In addition, although three sets of encryption conversion units or format conversion units are prepared, the number of sets is not limited to three.

The present invention is not limited to the above embodiments, and various changes and modifications can be made without departing from the spirit and scope of the invention. The embodiments can be appropriately combined as much as possible. In this case, combined effects are obtained. The embodiments incorporate inventions of various phases, and various inventions can be extracted by appropriately combining a plurality of disclosed components. For example, when an invention is extracted by omitting some of the components disclosed in the embodiments, the omitted parts are appropriately compensated by known techniques in practicing the extracted invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multimedia data relay system comprising:
a server computer which stores multimedia data;
a portable telephone which acquires the multimedia data from said server computer, executes relay processing for the acquired multimedia data, and outputs the multimedia data; and
a music player which writes the multimedia data output from said portable telephone, which has undergone the relay processing, in a memory card,
wherein said portable telephone sequentially acquires multimedia data each having a size processible in a memory of said portable telephone from said server computer, and executes the relay processing only in the memory of said portable telephone for the acquired multimedia data on the basis of a multimedia data request from said music player, and
the said portable telephone further comprises:
a plurality of first data conversion units which execute first conversion processing for the multimedia data;
a plurality of second data conversion units which execute second conversion processing for the multimedia data that have undergone the first conversion processing by said plurality of first data conversion units;
first determination means for determining whether a first data conversion unit that has ended processing is present in said plurality of first data conversion units;
acquisition means for, when said first determination means determines that said first data conversion unit that has ended processing is present, acquiring multimedia data each having a size processible by each of said plurality of first and second data conversion units from a server;
first input means for inputting the multimedia data acquired by said acquisition means to said first data conversion unit that has ended processing;
second determination means for determining whether a second data conversion unit that has ended processing is present in said plurality of second data conversion units;
second input means for, when said second determination means determines that said second data conversion unit that has ended processing is present, inputting the multimedia data that has undergone the first conversion processing by said first data conversion unit to said second data conversion unit that has ended processing; and
output means for outputting the multimedia data that have undergone the second conversion processing by said plurality of second data conversion units to a relay target in an order of input to said plurality of first data conversion units by said first input means.

2. An apparatus according to claim 1, wherein said portable telephone has no hard disk drive.

3. An apparatus according to claim 1, wherein the memory card is an SD memory card.

4. An apparatus according to claim 1, wherein said portable telephone acquires the multimedia data from said server computer when the relay processing becomes possible.

5. A multimedia data relay apparatus for executing relay processing only in a memory, the data relay apparatus comprising:
a plurality of first data conversion units which execute first conversion processing for multimedia data in the memory of the multimedia data relay apparatus only;
a plurality of second data conversion units which execute second conversion processing for the multimedia data that have undergone the first conversion processing by said plurality of first data conversion units in the memory of the multimedia data relay apparatus only;
first determination means in the memory of the multimedia data relay apparatus for determining whether a first data conversion unit that has ended processing is present in said plurality of first data conversion units;
acquisition means for, when said first determination means determines that said first data conversion unit that has ended processing is present, acquiring multimedia data each having a size processible by each of said plurality of first and second data conversion units from a server;
first input means for inputting the multimedia data acquired by said acquisition means to said first data conversion unit that has ended processing;
second determination means for determining whether a second data conversion unit that has ended processing is present in said plurality of second data conversion units;
second input means for, when said second determination means determines that said second data conversion unit that has ended processing is present, inputting the multimedia data that has undergone the first conversion processing by said first data conversion unit to said second data conversion unit that has ended processing; and
output means for outputting the multimedia data that have undergone the second conversion processing by said plurality of second data conversion units to a relay target in an order of input to said plurality of first data conversion units by said first input means.

6. An apparatus according to claim 5, wherein the first conversion processing executed by said plurality of first data conversion units and the second conversion processing executed by said plurality of second data conversion units are executed using a working area of the memory of the multimedia data relay apparatus.

7. An apparatus according to claim 6, wherein the memory comprises
a plurality of first working areas arranged in correspondence with said plurality of first data conversion units, respectively, to execute the first conversion processing, and
a plurality of second working areas arranged in correspondence with said plurality of second data conversion units, respectively, to execute the second conversion processing.

8. An apparatus according to claim 5, wherein when said first determination means determines that said first data conversion unit that has ended processing is present, said acquisition means outputs a transmission request for multimedia data each having a size processible by each of said plurality of first and second data conversion units to the server, thereby acquiring the multimedia data from the server.

9. An apparatus according to claim 5, wherein the first conversion processing is format conversion processing or encryption processing.

10. A multimedia data relay system comprising:
a server which stores multimedia data; and
a data relay apparatus which executes predetermined processing only in a memory for the multimedia data from said server and outputs the multimedia data that has undergone the predetermined processing to a relay target, wherein said data relay apparatus comprises:

a plurality of first data conversion units which execute first conversion processing for the multimedia data in a memory of the data relay apparatus only;

a plurality of second data conversion units which execute second conversion processing for the multimedia data that have undergone the first conversion processing by said plurality of first data conversion units in the memory of the data relay apparatus only;

first determination means in the memory of the multimedia data relay apparatus for determining whether a first data conversion unit that has ended processing is present in said plurality of first data conversion units;

acquisition means for, when said first determination means determines that said first data conversion unit that has ended processing is present, acquiring multimedia data each having a size processible by each of said plurality of first and second data conversion units from a server;

first input means for inputting the multimedia data acquired by said acquisition means to said first data conversion unit that has ended processing;

second determination means for determining whether a second data conversion unit that has ended processing is present in said plurality of second data conversion units;

second input means for, when said second determination means determines that said second data conversion unit that has ended processing is present, inputting the multimedia data that has undergone the first conversion processing by said first data conversion unit to said second data conversion unit that has ended processing; and output means for outputting the multimedia data that have undergone the second conversion processing by said plurality of second data conversion units to a relay target in an order of input to said plurality of first data conversion units by said first input means.

11. A multimedia data relay method in a multimedia data relay system that executes relay processing only in a memory, the system comprising a plurality of first data conversion units which execute first conversion processing for multimedia data in a memory of the multimedia data relay system only and a plurality of second data conversion units which execute second conversion processing for the multimedia data in the memory of the multimedia data relay system only that have undergone the first conversion processing by the plurality of first data conversion units, comprising steps of:

determining whether a first data conversion unit that has ended processing is present in the plurality of first data conversion units;

when it is determined that the first data conversion unit that has ended processing is present, acquiring multimedia data each having a size processible by each of the plurality of first and second data conversion units from a server;

inputting the acquired multimedia data to the first data conversion unit that has ended processing;

determining whether a second data conversion unit that has ended processing is present in the plurality of second data conversion units;

when it is determined that the second data conversion unit that has ended processing is present, inputting the multimedia data that has undergone the first conversion processing by the first data conversion unit to the second data conversion unit that has ended processing; and outputting the multimedia data that have undergone the second conversion processing by the plurality of second data conversion units to a relay target in an order of input to the plurality of first data conversion units by the first input means.

12. A multimedia data relay apparatus for executing relay processing only in a memory, the data relay apparatus comprising:

acquisition means for acquiring multimedia data from a server;

a first application program to execute first processing for the multimedia data acquired by said acquisition means;

a second application program to execute second processing for the multimedia data that has undergone the first processing by said first application program;

a memory comprising a plurality of first working areas to execute the first processing and a plurality of second working areas to execute the second processing;

control means for causing said first application program to execute the first processing for the multimedia data acquired by said acquisition means using one of the plurality of first working areas only, where processing has been ended, and causing said second application program to execute the second processing for the multimedia data that has undergone the first processing using one of the plurality of second working areas only, where processing has been ended; and output means for outputting the multimedia data that has undergone the second processing to a relay target.

* * * * *